C. HANKE.
SAUSAGE STUFFER.
APPLICATION FILED FEB. 3, 1912.
1,075,823.
Patented Oct. 14, 1913.
3 SHEETS—SHEET 1.
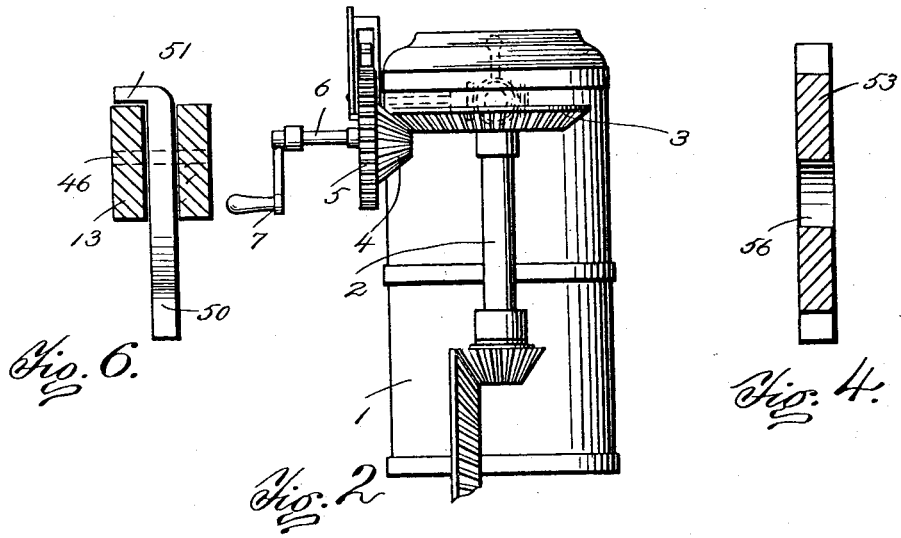
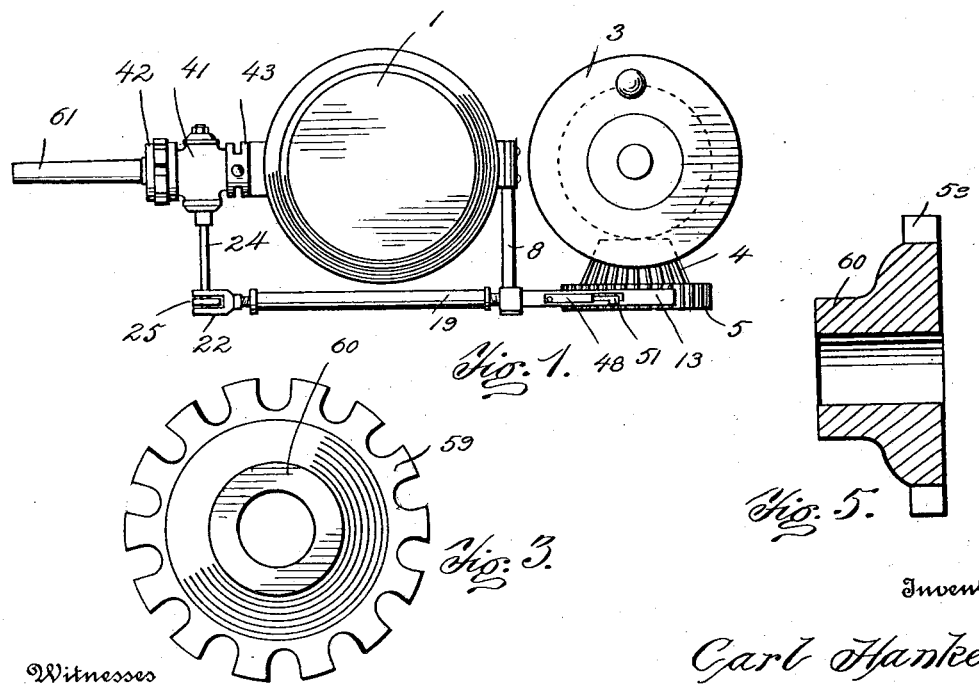
Witnesses
M. F. McKee
L. C. Bobys
Inventor
Carl Hanke
By Alex. J. Wedderburn, Jr.
Attorney C. HANKE.
SAUSAGE STUFFER.
APPLICATION FILED FEB. 3, 1912.
1,075,823.
Patented Oct. 14, 1913.
3 SHEETS—SHEET 2.
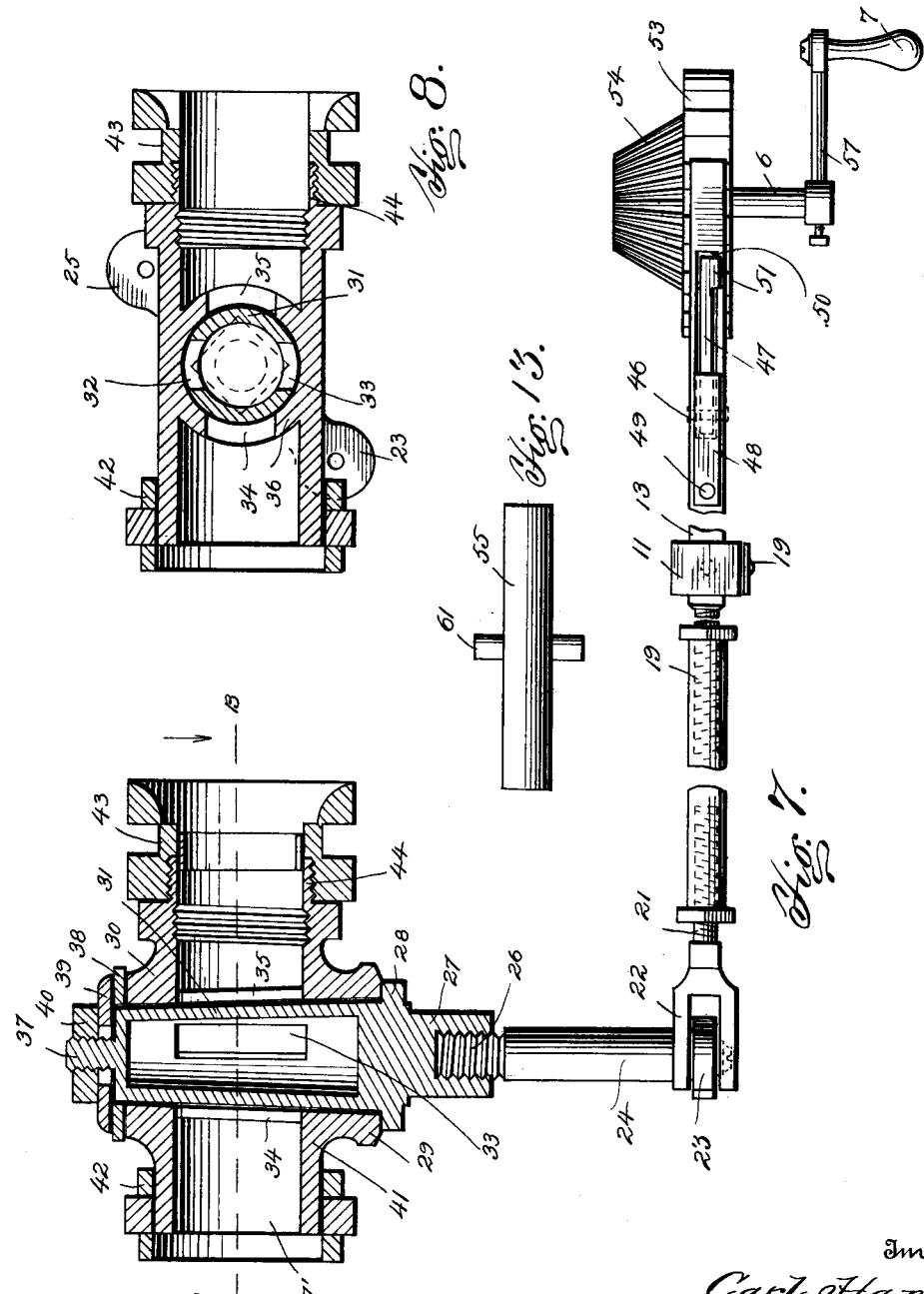

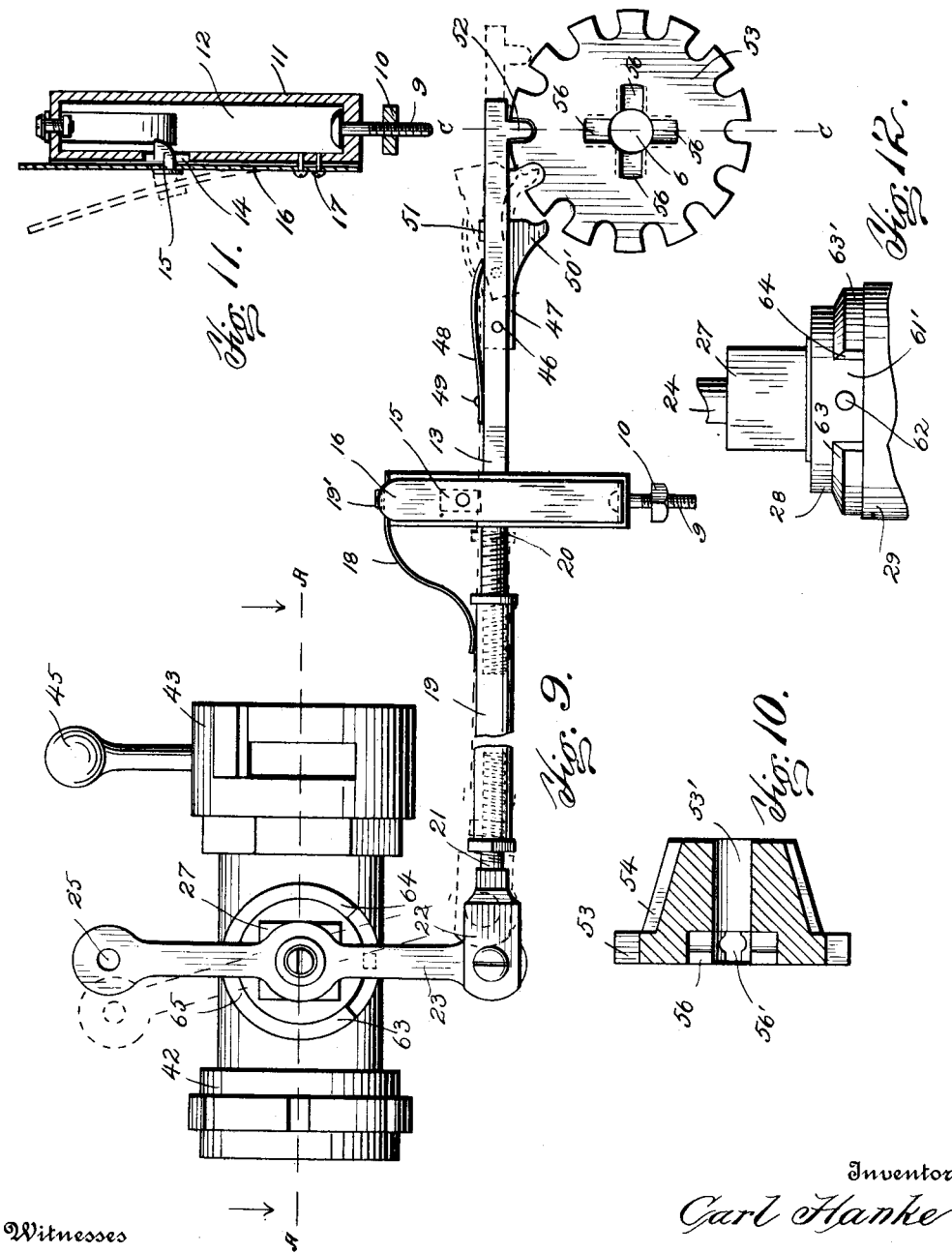

UNITED STATES PATENT OFFICE.

CARL HANKE, OF HANCOCK, MICHIGAN.

SAUSAGE-STUFFER.

1,075,823.  Specification of Letters Patent.  Patented Oct. 14, 1913.

Application filed February 3, 1912. Serial No. 675,187.

*To all whom it may concern:*

Be it known that I, CARL HANKE, a citizen of the United States, residing at Hancock, in the county of Houghton and State of Michigan, have invented certain new and useful Improvements in Sausage-Stuffers, of which the following is a specification.

This invention relates to improvements in hand operated sausage stuffers.

The object of my invention is to provide a simple, highly efficient and inexpensive valve mechanism for a sausage stuffer, which is designed to save exertion, time and trouble in operating a sausage stuffer.

In most of the sausage stuffing machines which are in use today, there are no means independent of the plunger which fills the stuffer with meat for checking the advance of the meat when the pressure exerted by the plunger shall be at its utmost, and I have found from experiment that a valve interposed between the meat container and the opening of the discharge nozzle thereof, can be made to quickly admit and cut-off the feed of meat from the meat container into the nozzle.

The leading feature of my invention resides in providing a suitable valve attachment for a sausage stuffer which is arranged to be actuated by the same crank that actuates the driving mechanism for moving the plunger to press the meat. By means of my arrangement not only can the operator advance and retract the plunger but through the instrumentality of the same means he is enabled to control the valve mechanism in order that when the nozzle is filled, the meat pressed by the plunger shall not further advance.

With the above and other objects in view my invention consists in the combination, arrangement and details of construction clearly shown in the drawings and then more particularly pointed out in the appended claims.

Similar reference characters indicate similar parts throughout the several views of the drawings in which, Figure 1 is a top plan view of a sausage stuffer to which my valve is attached in operative position, Fig. 2 is a vertical end section thereof, Fig. 3 is a top plan view of a driving gear wheel, Fig. 4 is a cross sectional view of the spur wheel element shown in Fig. 10, with the conical tooth portion obliterated, Fig. 5 is a cross sectional view of Fig. 3, Fig. 6 is a cross sectional view of the yielding tooth to be hereinafter described, and showing the valve rod in section, Fig. 7 is a top plan view of the valve mechanism, partly broken away and partly in section, Fig. 8 is a longitudinal sectional view taken on the line B—B of Fig. 7, Fig. 9 is a side elevation of the valve mechanism, Fig. 10 is a cross sectional view of one of the driving gears to be described, Fig. 11 is a sectional view in detail of the guide for the valve rod, Fig. 12 is a fragmental view in elevation of the valve casing showing the shoulders for limiting the plug of the valve therein, and Fig. 13 is a detail view of a shaft coöperating to drive the gear wheel shown in Fig. 10.

I contemplate using the valve mechanism to be described upon every form of sausage stuffer now in use, and my device will have to be mounted upon the stuffer in operative relation at preferably two points, the valve casing being removably secured to the stuffer at one point and side of the meat container of the stuffer, which is shown herein as a cylinder 1, and the actuating means for the valve being connected to the driving gear for the plunger in said cylinder at another point at the opposite side thereof.

In practice it will be necessary to select the proper form of gear wheel from those to be enumerated hereafter, for the purpose of causing the operating crank not only to drive the gear mechanism for the plunger but to actuate the valve which I have devised.

For the purpose of illustration only, I show a rotatable shaft 2 carrying a bevel wheel 3 arranged to mesh with the teeth in a conical portion 4 formed integral upon the spur wheel 5, the axis of shaft 6 of which carries a handle 7 serving as a crank for turning said spur wheel to actuate the first named shaft 2. Whether the gear wheels in the present type of machine for moving the plunger are disposed in a vertical or horizontal plane will matter little as the spur wheel for operating my valve may be operatively connected therewith by disposing the valve rod relatively to the spur wheel.

Mounted upon the meat cylinder 1 and extending outwardly therefrom is a bracing arm 8, and secured to the free end of said arm 8 is a guide member 11 for the valve rod 19, suitable means being employed to fasten the guide in fixed relation upon the arm such as a screw bolt 9 tapped through the floor of the guide and clamped by means of the nut 10 against the arm 8.

The guide 11 is, as clearly shown in Fig. 11, a vertical hollow casing in the space 12 of which is movable the rectangular rod 13 removably secured to the valve rod 19. Near the upper end of the guide 11 is formed an opening 14 through which normally projects a tongue 15 secured to a bar spring 16, fixed at its lower end at 17 to the guide 11, and free to move outwardly of the guide so as to retract the tongue 15. Fixedly secured by any suitable means such as a bolt 19′ to the top of the guide 11 is a sear spring 18 having its lower end bearing upon the rod 19 to hold it in operative position relatively to the driving spur wheel 53. The tongue 15 and spring member 16 are provided to hold the rod 13 out of operating position so that the tooth 52 may be held out of engagement with the spur wheel 53 whenever the meat cylinder is empty and it is desired to fill the same by retracting the plunger, but without actuating the valve plug to open position as would be the case if the tooth 52 were held in engagement with the spur wheel. The operator effects this by manually raising the rod 13 until the spring pressed tongue 15 snaps under it.

The end 20 of the rectangular bar rod 13 is screwthreaded into the rod 19 which is hollow to receive it, and at the opposite end of said rod is screw-threaded the shank 21 of a bifurcated member 22 between the offsets of which is pivoted the valve operating arm 23, having an upper arm 25, which may serve to replace arm 23 should the latter be broken. The hollow rod 19 will preferably be formed with right and left handed screw pitches at its opposite ends for the members 21 and 20. The arms 23 and 25 form a lever which at its intermediate point is formed with a right angular rod 24 which is screwthreaded at 26 to the rectangular end 27 of a preferably conical plug or valve 31, the flange 28 carried by the member 27 having engagement with the periphery of the boss 29 forming an integral part of the casing 41. The free end of the plug 31 is formed with a reduced screw threaded portion 37 which is loosely surrounded by a ring 39 arranged to bear immediately against a washer 38, the nut 40 engaging the screw threaded portion 37 to hold said ring against said washer, which washer bears upon a boss 30, which is diametrically opposite the boss 29 of the casing 41. The conical plug is formed with diametrically opposite and elongated openings 32 and 33 respectively, which openings are preferably in length equal to the diameter of the bore 37′ of the casing 41.

Formed within the bore 37′ of the casing 41 is a hollow member or casing 36 providing a snug fitting for the conical valve 31, and formed with diametrically opposite and elongated openings 34 and 35 respectively adapted to register with the openings in said plugs. The arrangement and disposition of the conical plug 31 in the hollow member 36 of the casing 41 is such that when the openings 32 and 33 of the plug register with the co-extensive openings 34 and 35 formed in said member the levers formed by the arms 23 and 25 will be obliquely disposed relatively to the longitudinal axis of the casing 41, and so that the lever may be turned one-quarter of a rotation to occupy an oblique position as shown in Fig. 8, in order to throw said openings out of register and to cause said plug to bar the openings 34 and 35 in the casing or hollow member 36.

A swiveling coupling 42 engages the outermost end of the casing 41 which is formed with a bore communicating with the bore 37′ of said casing and with a discharge nozzle 61 respectively, which nozzle is operatively secured to said coupling. The swiveling coupling 43 which may be of any make and form to fit in size and shape the bore in the sausage stuffer cylinder, engages the opposite end of the cylinder 41 and provides intercommunication between the cylinder and the bore 37′ of casing 41 so that the meat may, when the plug is open, pass from the cylinder into the casing and out of the discharge nozzle 61.

The casing 41 may be formed with a screw threaded extension 44 engaged by the coupling 43, and a handle 45 may be formed upon said coupling 43 as a means for swiveling it or for screwing it onto the cylinder.

Formed upon the rectangular rod 13 near its free end is an elongated opening 50 which is spanned at its end nearest to the guide 11 by a transverse pivot 46 upon which is mounted the elongated portion 47 of a dog or yielding tooth 50′, the upper edge of which is normally engaged by the free end of a bar spring 48, which is fixed at 49 to the solid part of the rod 13, said spring serving to hold the right angular offset 51 of the dog or tooth 50′ in overlapping contact upon the upper edge of said rod in order that the dog or tooth may suitably project thereunder. A preferably single tooth 52 having a rounded edge is formed at the extreme end of the rectangular rod 13 and is arranged to enter snugly the correspondingly shaped recess formed by the opposite teeth of the spur or cog wheel 53, which as above stated forms part of the conical bevel wheel 4. The cog wheel 53 is of such a construction as to accommodate it to be easily connected to a shaft disposed either in a vertical or horizontal plane and for this purpose said cog wheel is formed with a substantially Greek cross recess, each of the offsets of which recess is designated 56 and terminates in its back portion in a rounded enlargement 56'. It will thus be seen that the combined spur and bevel wheel is formed with a new arrangement of slots which is preferable to those commonly in use, which latter were open to the objection of causing the pin 61 formed upon the shaft 55 to slip out of said slots 56, thereby also causing the said shaft pins to lose control of the plunger in the meat cylinder resulting in creating a suction in the latter.

The specially constructed shaft 55, shown clearly in Fig. 13, is formed near one end with a pin 61 which projects at right angles to the axis of said shaft, as clearly shown in said figure, the arrangement being such that the pin may engage two oppositely arranged slots 56 of the Greek cross recess above mentioned in either a horizontal or a vertical plane as shown in Fig. 10.

It will be noticed that the cog wheel 53 is formed with a bore 53' through which the shaft 55 may pass in an obvious manner. Instead of the cog wheel described the form of driving toothed wheel 59 may be used equally well, said toothed wheel 59 is formed with a tubular extension 60 through which and the bore of the wheel a shaft may be passed, this style of wheel requiring a set-screw as a means of attachment to a shaft.

The boss 29 integrally formed upon the casing 41 terminates in an annular member 63' which has its opposite ends 63 and 64 spaced apart, as clearly shown in Fig. 12, so as to form limiting shoulders against which an outwardly extending pin 62 formed upon the flange 28 upon the end 27 of the plug may contact when the valve shall have been turned to opened or closed position respectively.

The device will operate as follows: The cylinder 1 containing the meat has a plunger (not shown) working therein for the purpose of turning the meat out of the cylinder into the casing to be filled and as hereinbefore described, the plunger is actuated by the crank 7 through the instrumentality of the toothed wheel described.

Ordinarily when the crank of the sausage stuffer is turned to actuate the plunger, the meat is directly acted upon by the plunger and is forced through the discharge nozzle into the skin: in order that the operator may prevent the overfilling of the skin he must hold the crank inert while the pressure of the meat is still being exerted and must also manipulate the crank in such a way as to fill the discharge nozzle, a process which is most tedious and wasteful. I have provided my valve attachment to obviate this source of annoyance, and when the crank 7 is turned it not only actuates the plunger and thereby causes the meat in the cylinder to be forced outwardly by said plunger into the bore 37' of the casing 41, but it also, owing to the cog wheel 53 turned by the crank, actuates the plug 31, establishing intercommunication between the inlet and outlet ends of said casing 41. The tooth 52 formed upon the rod 13 is held in a recess between the teeth of the cog wheel 53, the plug 31 will be partially open and as the crank is turned to actuate the plunger the meat forced by the plunger into the casing will be free to enter the nozzle 61 and fill the skin applied to the nozzle. The operator continues to turn the crank until the tooth 52 rides clear of said cog wheel so that the teeth of the cog wheel may respectively engage the dog or yielding tooth 50' working in the slot 50 which will be forced aside out of the appropriate recess of the cog wheel in which it fits to allow the cog wheel to turn; when the tooth 52 shall be out of range of the cog wheel 53, it will be held down in its position by means of sear spring 18. If the meat cylinder is empty it can be refilled without actuating the valve mechanism by taking hold of the rod 13 and lifting it, said rod being guided in the member 11, and it will be free to ride upwardly against the inwardly projecting dog 15 which will snap under it to prevent the tooth 52 falling into engagement with the cog wheel 53, until the rod 15 shall be forced downward and restored to its normal position. When the handle 7 is actuated the lever arm will be moved to an oblique position to open the plug and allow the skins to be filled. When the arm 23 shall have have been moved to its last named position, the plug 31 will be in open position and its openings 32 and 33 will be in register with the corresponding openings 34 and 35 in the casing. When sufficient meat has passed through the nozzle 61 to fill a casing, the operator will release hold upon the crank handle 7, whereupon the pressure of the meat in the meat cylinder will automatically move the crank handle in a reverse direction thereby causing the cog wheel 53 through the gear connections to retract the plunger from the meat which is forced against the closed plug and as the cog wheel 53 is slightly moved its teeth will engage the yielding dog 50' at its forward edge and will thereby move the rod 13 backwardly a sufficient distance to cause the arm 23 connected to the plug to occupy the position shown in Fig. 9; it will be noticed that as the teeth of the cog wheel 53 engage the forward edge of the dog 50', said dog will serve as a supplementary tooth upon the rod 13 since it cannot move through the slot 50' because its right angular offset 50 is forced by said teeth rigidly in contact with the upper edge 13 and as the tooth 50' is dislodged, said first named tooth will be caused to drop into the appropriate recess in the cog wheel 53 because the tooth 50 will then be clear of the wheel and the tooth 52 within range thereof and as said cog wheel is rotated to retract the plunger its teeth will engage the tooth 52 and further move the rod 13 backwardly to close the valve 31 by moving the arm 23 connected to said valve to its opposite oblique position to cause the openings 32 and 33 within said plug to fall out of register with the corresponding openings 34 and 35 of the casing, no exertion on the part of the operator will be required in turning the crank 7 in a reverse direction because immediately after the dog 50' has been impelled by the cog wheel 53 and the arm 23 in its position, shown in Fig. 9, the pressure upon the meat will be so great that when the crank is released the meat will expand to normal forcing a retrograde movement of the entire mechanism which operates to cause the valve to close to its fullest extent. When the valve is open the meat will rush through the bore 37' of the casing 41, and through the nozzle 61 communicating therewith and into the skin to be filled. The operator will then repeat the operation above described to fill another skin.

Numerous modifications may be resorted to in practice without departing in essence from the invention disclosed.

I claim and desire to secure by Letters Patent:

1. A device of the kind described comprising a meat cylinder having a meat pressing plunger, a casing removably secured thereto and having a discharge nozzle, a valve in said casing arranged to admit and cut off the supply of meat to said nozzle, means for simultaneously actuating said plunger and moving said valve to open position, means for preventing the actuation of said valve, and means for simultaneously retracting said plunger and moving said valve to open position.

2. A device of the kind described comprising a meat cylinder having a meat pressing plunger, a casing removably connected thereto and having a discharge spout, a rotatable valve disposed in said casing, a valve rod projecting exteriorly of said casing, a wheel for actuating said plunger and formed with a cog wheel off-set, a lever rotatably mounted upon said rod, a rod pivoted to said lever and having an integral tooth meshing with said cog wheel offset, means for holding said tooth in engagement with the cog wheel, said tooth riding clear of said cog-wheel when said plunger is actuated whereby said valve will be open, means for holding said tooth out of engagement with said cog-wheel, said wheel being reversible to retract the plunger, and means for causing said tooth to operatively engage said cog wheel, during its reverse movement to close said valve.

3. In combination with a meat cylinder having a meat pressing plunger, a valve casing removably secured thereto and having a discharge nozzle, a rotatable valve in said casing opening and closing communication between said cylinder and nozzle, a hand operated wheel for actuating said plunger, means actuated during a part of the cycle of said wheel to rotate said valve and open and close it respectively as it moves in opposite directions, and means for holding said valve against rotation as said wheel is turned.

4. A device of the kind described comprising a meat cylinder having a meat pressing plunger, a casing removably secured to said cylinder and having a discharge spout, a valve in said casing arranged to open and close communication between said cylinder and spout, a cog-wheel having a member operatively actuating said plunger, a rod having a tooth normally meshing with said cog wheel, a yieldable tooth contiguous to said first named tooth, said cog wheel when rotating forcing said first named tooth out of mesh, means for holding said latter tooth in position to mesh with said cog wheel, said plunger being retracted during the reverse movement of said cog wheel, said cog-wheel during its reverse movement engaging said yieldable tooth to restore said other tooth to normal position, and means for holding said valve inactive as said cog wheel rotates.

5. In combination a meat cylinder, a casing removably secured thereto, said cylinder having a meat pressing plunger, a discharge nozzle secured to said casing and having oppositely arranged openings, an annular member formed in said casing surrounding said valve and having oppositely arranged openings arranged to register with said first named openings, a lever disposed exteriorly of said casing and arranged to rotate said valve, reciprocatable means engaging said lever to cause said openings to fall in and out of register, a member rotating to actuate said plunger, means controlled by said rotatable member to actuate said last named means before the operation of said member is complete, and means for holding said valve against movement as said member rotates.

6. In combination a meat receptacle, an outlet connected thereto, a valve in said outlet, a plunger for causing pressure in said receptacle, operating means for said valve and means whereby a release of manual control of said operating means will cause said valve to close.

7. In combination a cylinder, a plunger thereon, a casing removably secured thereto having a discharge spout, a rotatable valve thereon, means for operating said plunger, said means adapted to operate said valve, said valve adapted to be reversed, a lever secured to said valve, an elongated rod to which said lever is pivoted, means for limiting the movement of said lever, said means consisting of tooth wheels and a cog wheel for operating same.

8. In combination a cylinder, a plunger thereon, a casing removably secured thereto having a discharge spout, a rotatable valve thereon, means for operating said plunger, said means adapted to operate said valve, said valve adapted to be reversed, a lever secured to said valve, an elongated rod to which said lever is pivoted, means for limiting the movement of said lever, said means consisting of tooth wheels, a cog wheel for operating same, a guide having an opening in which said rod is disposed.

9. In combination a cylinder, a plunger thereon, a casing removably secured thereto having a discharge spout, a rotatable valve thereon, means for operating said plunger, said means adapted to operate said valve, said valve adapted to be reversed, a lever secured to said valve, an elongated rod to which said lever is pivoted, means for limiting the movement of said lever, said means consisting of tooth wheels, a cog wheel for operating same, a guide having an opening in which said rod is disposed, a spring arm having a latch projecting through said opening and engaging said rod.

10. In combination a cylinder, a plunger thereon, a casing removably secured thereto having a discharge spout, a rotatable valve thereon, means for operating said plunger, said means adapted to operate said valve, said valve adapted to be reversed, a lever secured to said valve, an elongated rod to which said lever is pivoted, means for limiting the movement of said lever, said means consisting of tooth wheels, a cog wheel for operating same, a guide having an opening in which said rod is disposed, a spring arm having a latch projecting through said opening and engaging said rod, a tooth on the free end of said rod and means for causing said tooth to engage said cog wheel.

11. In combination a cylinder, a plunger thereon, a casing removably secured thereto having a discharge spout, a rotatable valve thereon, means for operating said plunger, said means adapted to operate said valve, said valve adapted to be reversed, a lever secured to said valve, an elongated rod to which said lever is pivoted, means for limiting the movement of said lever, said means consisting of tooth wheels, a cog wheel for operating same, a guide having an opening in which said rod is disposed, a spring arm having a latch projecting through said opening and engaging said rod, a tooth on the free end of said rod, means for causing said tooth to engage said cog wheel, and an auxiliary tooth on said rod arranged to be dislodged when said cog wheel is actuated.

12. In combination a meat receptacle, an outlet connected thereto, a valve in said outlet, a plunger for causing pressure in said receptacle, operating means for said valve and means whereby a release of manual control of said operating means will cause said valve to close, said means being operated by the action of said plunger caused by said pressure.

In testimony whereof I affix my signature in presence of two witnesses.

CARL HANKE.

Witnesses:
M. A. EUDY,
JACOB BAER.

---

Copies of this patent may be obtained for five cents each, by addressing the "Commissioner of Patents, Washington, D. C."